R. BRYDON.
GRAIN CAR DOORS.

No. 180,699. Patented Aug. 8, 1876.

Witnesses:
William Ross
William Sandford

Inventor:
Robert Brydon
per Ridout Aird & Co
Attys

UNITED STATES PATENT OFFICE.

ROBERT BRYDON, OF NEWBURY, ONTARIO, CANADA.

IMPROVEMENT IN GRAIN-CAR DOORS.

Specification forming part of Letters Patent No. 180,699, dated August 8, 1876; application filed February 25, 1876.

*To all whom it may concern:*

Be it known that I, ROBERT BRYDON, of the village of Newbury, in the county of Middlesex and Province of Ontario, Canada, have invented an Improvement in Railroad Grain-Car Doors, of which the following is a specification:

The object of my invention is so to attach the doors of railroad-cars used for carrying grain in bulk that they cannot be used for any other purpose, and consequently are always in proper condition for the work they are designed to perform. It consists in placing the said grain-door within a properly-designed frame, which permits it to be opened and closed without becoming detached, and otherwise facilitates the operation, as hereafter described.

Figure 1:
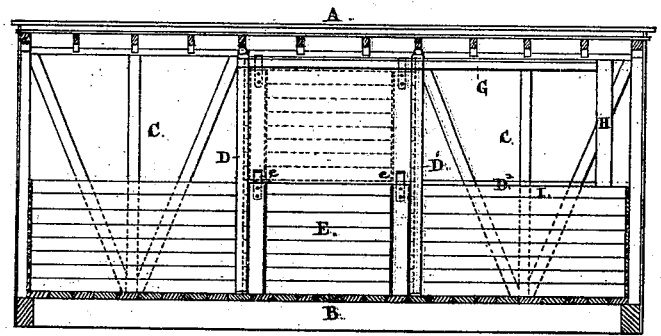
Figure 2:
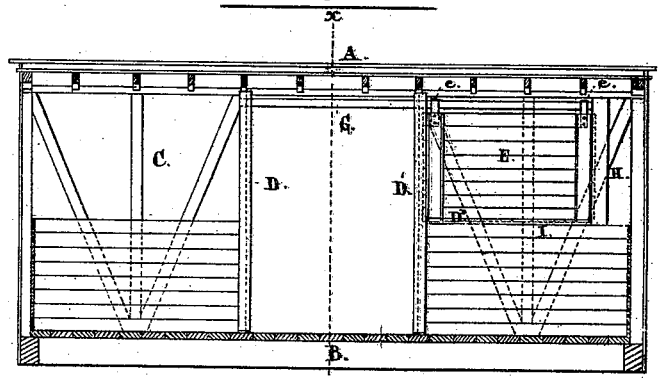
Figure 3:
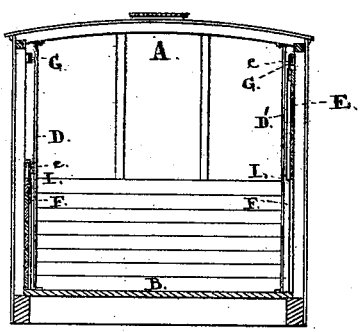

In the drawings, Figures 1 and 2 are inside sectional views longitudinally of the side of a car, showing the arrangements of the grain-door. Fig. 3 is an end section through $x$ $x$.

A is the roof of car; B, the floor of same; C, the side of the car. D D' are flat bars of iron iron screwed to the floor B and roof A of car, a space being left between them and the side C of the car. (See Fig. 3.) $e$ $e$ are hooks screwed to the top of the grain-door E, which is formed as shown, and when closed, as represented in drawing, fits tightly between the side of the car, and the strips of wood F F screwed to the inside of the bars D D', as shown. Above these strips F F the space between the bars D D' and the side of the car is sufficient to allow ample play for the door E, so that when lifted up and the hooks $e$ $e$ slipped upon the horizontal bar G the said door can pass between the side C of the car and the bar D' into the position it is shown in by dotted lines.

When the car is to be used for carrying grain in bulk the door E is shut down, as shown in drawing. In order to open the door E it is raised up till the hooks $e$ $e$ can be slipped over the horizontal bar G, when the door E can be slipped to one side, passing between the side of the car and the bar D' till it reaches the position shown in dotted lines, where it is stopped from going farther by the block H. In this position the door E is supported partially by the top bar I of the wainscoting.

When the door E has once been put into the frame formed by the bars D D', horizontal bar G, block H, and top bar I, in conjunction with the side of the car, the drawing shows that it cannot be removed without pulling a portion of the said frame apart.

What I claim as my invention is—

1. In railroad-cars used for carrying grain in bulk the door E, placed within a frame formed by the bars D D', horizontal bar G, block H, and top bar I, in combination with the side C of the car, substantially as described, and for the purpose specified.

2. The hooks $e$ $e$, attached to the door E, in combination with the bar G, substantially as described, and for the purpose specified.

Toronto, 3d of January, 1876.

ROBERT BRYDON.

Witnesses:
 JAMES DOUGLAS,
 ALEX. GRAHAM, M. D.